(12) United States Patent
Sethi

(10) Patent No.: US 11,941,974 B2
(45) Date of Patent: Mar. 26, 2024

(54) SYSTEMS, METHODS, AND DEVICES FOR HAPTIC FEEDBACK

(71) Applicant: TDK Corporation, Tokyo (JP)

(72) Inventor: Rakesh Sethi, San Jose, CA (US)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/869,078

(22) Filed: Jul. 20, 2022

(65) Prior Publication Data

US 2024/0029528 A1    Jan. 25, 2024

(51) Int. Cl.
*H04B 3/36* (2006.01)
*G08B 6/00* (2006.01)

(52) U.S. Cl.
CPC ..................... *G08B 6/00* (2013.01)

(58) Field of Classification Search
CPC . G08B 6/00; G06F 3/014; G06F 3/016; G06F 3/0414; A63F 13/285
See application file for complete search history.

(56) References Cited

U.S. PATENT DOCUMENTS

| | | | | |
|---|---|---|---|---|
| 10,055,949 B2 * | 8/2018 | Maalouf | ................ | G06F 3/014 |
| 2010/0109486 A1 * | 5/2010 | Polyakov | ............... | H10N 30/06 29/25.35 |
| 2016/0296838 A1 * | 10/2016 | Goetgeluk | .............. | A63F 13/00 |
| 2016/0363997 A1 * | 12/2016 | Black | ....................... | G06F 3/014 |
| 2020/0361095 A1 * | 11/2020 | Nguyen | ................. | B32B 27/12 |

FOREIGN PATENT DOCUMENTS

KR    102235905 B1 *   4/2021

* cited by examiner

*Primary Examiner* — Toan N Pham
(74) *Attorney, Agent, or Firm* — Morgan, Lewis & Bockius LLP

(57) ABSTRACT

Systems, methods, and devices for haptic feedback are provided. A microfluidic device includes an inlet port for supplying a fluid into the microfluidic device. A tube receives the fluid from the inlet port. The microfluidic device includes a piezoelectric actuator for realizing a displacement of a substrate to which the microfluidic device is attached, the displacement based on an electrical actuation applied to the piezoelectric actuator, and an amount of the fluid or a pressure in the tube. In some embodiments, the tube includes a carbon nanotube. In some embodiments, an amount of the fluid in the tube is controlled by an actuator (e.g., the piezoelectric actuator).

21 Claims, 12 Drawing Sheets

200

(202) Providing an activation signal for activating a first microfluidic device of a plurality of electrically-connected microfluidic devices embedded within first and second layers of a substrate, the first microfluidic device including: an inlet port for supplying a fluid into the first microfluidic device, a tube for receiving the fluid from the inlet port, and a piezoelectric actuator.

(204) Electrically actuating the piezoelectric actuator based on the activation signal for controlling an amount of the fluid supplied to the tube via the inlet port to realize a displacement of a portion of the first layer or the second layer of the substrate, the portion corresponding to an area of the substrate where the first microfluidic device is arranged and the displacement being based on the amount of the fluid in the tube.

Figure 2

1000
| | Type | Logic function |
|---|---|---|
| A | | |
| 1 |  | $C = A \wedge B$ |
| 2 | 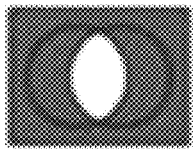 | $C = \sim(A \wedge B)$ |
| 3 | 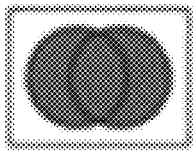 | $C = A \vee B$ |
| 4 | 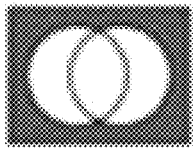 | $C = \sim(A \vee B)$ |
| 5 | 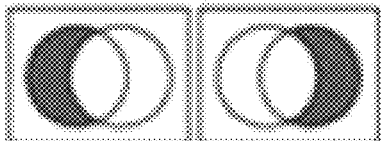 | $C = A \wedge \sim B,\ C = \sim A \wedge B$ |
| 6 | 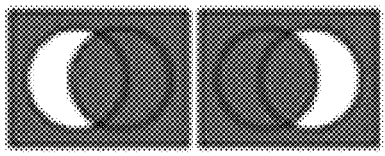 | $C = \sim A \vee B,\ C = A \vee \sim B$ |
| 7 | 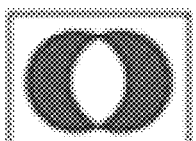 | $C = \sim(A \leftrightarrow B)$ |
| 8 | 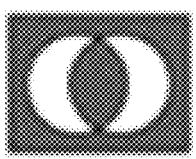 | $C = A \leftrightarrow B$ |
Figure 10

SYSTEMS, METHODS, AND DEVICES FOR HAPTIC FEEDBACK

TECHNICAL FIELD

The present disclosure relates to haptic feedback, and more particularly, to generating haptic feedback using piezoelectric materials and/or an effect of changing a stiffness of a tube, such as a carbon nanotube by absorption and/or desorption of a fluid by the carbon nanotube.

BACKGROUND

Interactive computer gaming is an expanding industry, which has led to the realization of digital reality environments. A digital reality environment is a space where a user interacts with digital content, such as a virtual reality (VR) environment, an augmented reality (AR) environment, or a mixed reality (MR) environment. When interacting with the digital reality environment, the user often desires feedback to indicate touch as the user interacts with one or more digital objects within the digital reality environment, also known as "haptic feedback."

Conventional solutions for providing haptic feedback include kinesthetic feedback mechanisms and/or tactile feedback mechanisms, such as a vibration mechanism, a texture mechanism, a heat mechanism, or a combination thereof. However, such conventional solutions do not allow for flexible control that provides granular touch sensation due to the mechanical nature of the solutions and limitations that prevent the feedback mechanisms from operating at micron range. Furthermore, conventional solutions often require complex internal components, such as piston systems or sliding articulating features, which are failure provide and expensive to repair. For instance, conventional air actuation solutions require large pumps that cannot be worn by an end-user or integrated with a body platform when interacting with digital reality environments.

Thus, there is a need for reliable, precise, scalable, and dynamic haptic feedback.

The information disclosed in this Background of the Invention section is only for enhancement of understanding of the general background of the invention and should not be taken as an acknowledgement or any form of suggestion that this information forms the prior art already known to a person skilled in the art.

SUMMARY

Given the above background, what is needed in the art are systems, methods, and devices for providing haptic feedback.

Accordingly, various aspects of the present disclosure are directed to providing systems, methods, and devices for haptic feedback.

An aspect of the present disclosure is directed to providing systems, methods, and apparatuses for haptic feedback. The systems, methods, and devices of the present disclosure utilize a microfluidic device in order to cause and/or control a displacement of a substrate, such as a fabric of a smart garment/wearable device. In some embodiments, the displacement of the substrate is between 0.5 millimeters (mm) to about 10 mm or to about 2 mm, which allows for providing a granular, localized sensation (e.g., touch sensation) felt by a body of a user near a location of the microfluidic device.

In some embodiments, the systems, methods, and devices of the present disclosure allow for embedding a plurality of microfluidic devices within a layer of a substrate (e.g., an inner surface and/or an outer surface of the substrate). From this, the systems, methods, and devices of the present disclosure allow for fluidic control in order to provide localized actuation at a respective microfluidic device in the plurality of microfluidic devices. Accordingly, by utilizing the microfluidic device, the systems, methods, and devices of the present disclosure provide localized force vector management. Moreover, given the structure of the microfluidic device, in some embodiments, the systems, methods, and devices of the present disclosure provide varying pressure generated locally at each microfluidic device in the plurality of microfluidic devices.

In some embodiments, the microfluidic device includes a tube, more particularly a carbon nanotube. The carbon nanotube allows for selective absorption and/or desorption of a fluid received by the microfluidic device in order to provide a displacement of the substrate, which, in turn, creates a physical sensation at the microfluidic device that is felt by the body of the user.

In more detail, one aspect of the present disclosure is directed to providing a microfluidic device. The microfluidic device includes an inlet port for supplying a fluid into the microfluidic device. Moreover, the microfluidic device includes a tube for receiving the fluid from the inlet port. Furthermore, the microfluidic device includes a piezoelectric actuator for realizing a displacement of a substrate to which the microfluidic device is attached. The displacement based on (i) an electrical actuation applied to the piezoelectric actuator and (ii) an amount of the fluid or a pressure in the tube.

In some embodiments, the piezoelectric actuator is arranged closer to a substrate surface that is to realize the displacement than the tube.

In some embodiments, the microfluidic device further includes a first actuator for controlling an amount of the fluid supplied to the tube via the inlet port.

In some embodiments, the tube is arranged closer to a substrate surface that is to realize the displacement than the piezoelectric actuator.

In some embodiments, the piezoelectric actuator includes the first actuator.

In some embodiments, the microfluidic device further includes first and second electrodes for electrically actuating the piezoelectric actuator arranged between the first and second electrodes.

In some embodiments, the microfluidic device further includes an impedance layer for matching a first impedance of the tube and/or a second impedance of the piezoelectric actuator.

In some embodiments, the tube, the piezoelectric actuator, the first and second electrodes, and the impedance layer are arranged in a multilayer stack, the multilayer stack for embedding between an outer surface and an inner surface of the substrate.

In some embodiments, the microfluidic device further includes an outlet port for allowing the fluid to flow out of the tube.

In some embodiments, the microfluidic device further includes a second actuator for controlling an amount of the fluid flowing out of the tube via the outlet port.

In some embodiments, the tube includes a carbon nanotube.

In some embodiments, the microfluidic device is embedded within a first layer and a second layer of the substrate, and the tube is arranged between the piezoelectric actuator and the first layer or the second layer.

In some embodiments, the impedance layer is composed of Aluminum nitride (AlN) and/or Silicon carbide (SiC).

Another aspect of the present disclosure is directed to providing a device. The device includes a substrate having a first layer and a second layer. Furthermore, the device includes a plurality of electrically-connected microfluidic devices embedded within the first and second layers of the substrate. Each microfluidic device of the plurality of electrically-connected microfluidic devices is individually activated based on an activation signal. Moreover, each microfluidic device of the plurality of electrically-connected microfluidic devices includes an inlet port for supplying a fluid into the respective microfluidic device. Furthermore, each microfluidic device of the plurality of electrically-connected microfluidic devices includes a tube for receiving the fluid from the inlet port. The device further includes a piezoelectric actuator for controlling an amount of the fluid supplied to the tube via the inlet port based on the activation signal to realize a displacement of a portion of the first layer or the second layer of the substrate. The portion corresponds to an area of the substrate where the respective microfluidic device is arranged. Furthermore, the displacement is based on the amount of the fluid in the tube or a pressure in the tube.

In some embodiments, the plurality of electrically-connected microfluidic devices is arranged in a helical pattern.

In some embodiments, each microfluidic device of the plurality of electrically-connected microfluidic devices further includes first and second electrodes for electrically actuating, based on the activation signal, the respective piezoelectric actuator arranged between the first and second electrodes.

In some embodiments, each microfluidic device of the plurality of electrically-connected microfluidic devices further includes an impedance layer for matching a first impedance of the tube and/or a second impedance of the piezoelectric actuator.

In some embodiments, the impedance layer is composed of AlN and/or SiC.

In some embodiments, each microfluidic device of the plurality of electrically-connected microfluidic devices further includes an outlet port for allowing the fluid to flow out of the tube.

In some embodiments, the tube includes a carbon nanotube.

In some embodiments, the tube is arranged between the piezoelectric actuator and the first layer or the second layer.

Yet another aspect of the present disclosure is directed to providing a method. The method includes providing an activation signal for activating a first microfluidic device of a plurality of electrically-connected microfluidic devices embedded within first and second layers of a substrate. The first microfluidic device includes an inlet port for supplying a fluid into the first microfluidic device. Furthermore, the first microfluidic device includes a tube for receiving the fluid from the inlet port. Additionally, the first microfluidic device includes a piezoelectric actuator. Moreover, the method further includes electrically actuating the piezoelectric actuator based on the activation signal for controlling an amount of the fluid supplied to the tube via the inlet port to realize a displacement of a portion of the first layer or the second layer of the substrate. The portion corresponds to an area of the substrate where the first microfluidic device is arranged. Furthermore, the displacement is based on the amount of the fluid or a pressure in the tube.

The systems, methods, and apparatuses of the present disclosure have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 provides a flow chart of methods, in accordance with an embodiment of the present disclosure;

FIG. 10 illustrates exemplary logical functions that are used implemented in various embodiments of the present disclosure.

Figure 1:
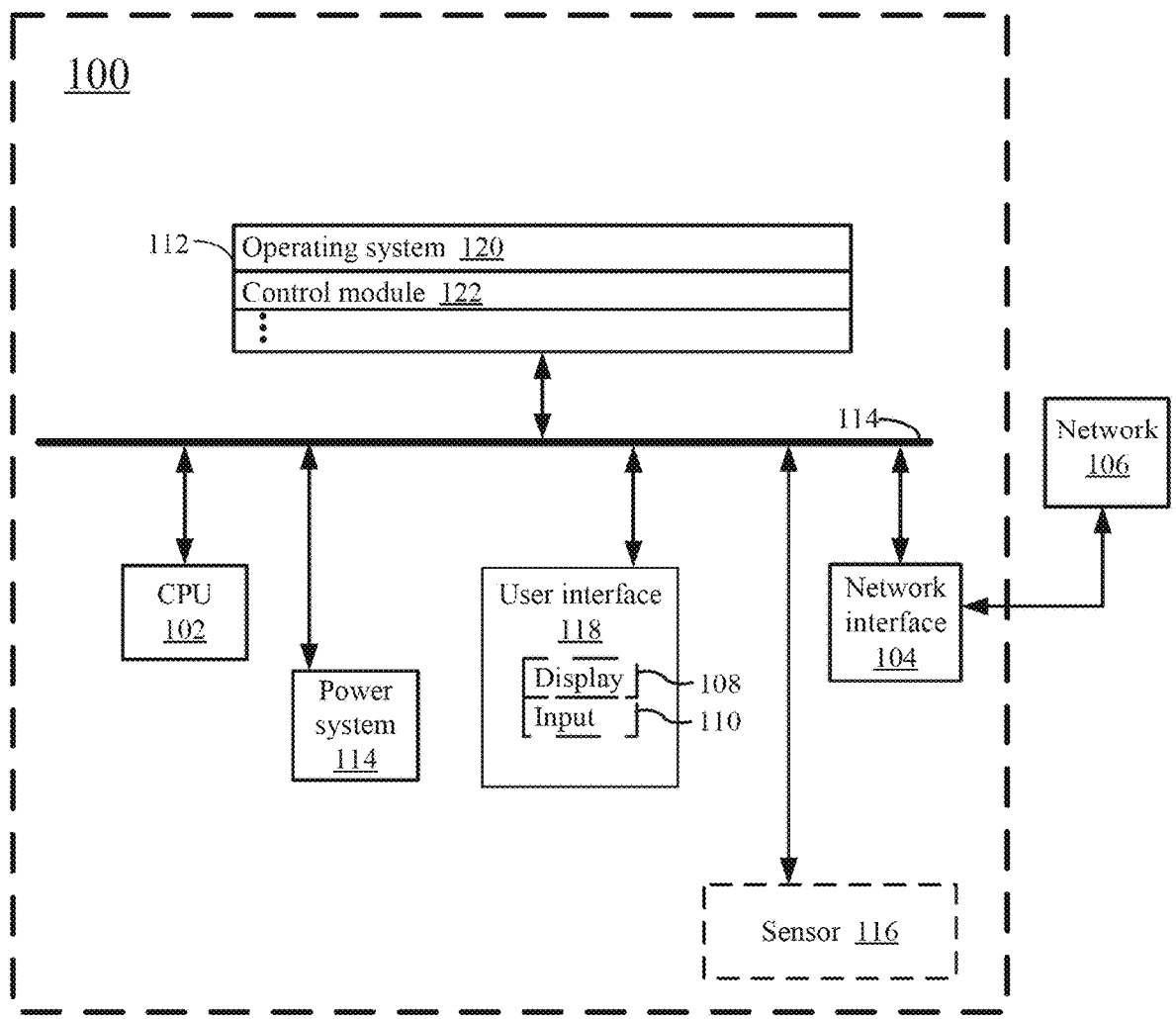
FIG. 1 illustrates various modules and/or components of a device, in accordance with an embodiment of the present disclosure.

In the figures, reference numbers refer to the same or equivalent parts of the present invention throughout the several figures of the drawing.

DETAILED DESCRIPTION

The present disclosure provides systems, methods, and devices that facilitate haptic feedback. For instance, an aspect of the present disclosure is directed to providing a microfluidic device. The microfluidic device is attached to a substrate, such as a material of a glove configured to be worn by a hand of a user. The microfluidic device includes an inlet port that is configured to supply a fluid, such as a liquid or gas, into the microfluidic device. Moreover, the microfluidic device includes a tube that is configured for receiving the fluid from the inlet port. For instance, in some embodiments, the tube includes a carbon nanotube, which provides for a substrate having configurable flexibility (e.g., stiffness) based on a fluid transfer process (e.g., absorption and/or desorption of the fluid). Furthermore, the microfluidic device includes a piezoelectric actuator that is utilized for realizing a displacement of a substrate, such as based on an electrical actuation applied to the piezoelectric actuator, an amount of the fluid in the tube, a pressure in the tube, or a combination thereof.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For instance, a unique composite identifier could be termed a second unique composite identifier, and, similarly, a second unique composite identifier could be termed a first unique composite identifier, without departing from the scope of the present disclosure. The first unique composite identifier and the second unique composite identifier are both unique composite identifiers, but they are not the same unique composite identifier.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

For convenience in explanation and accurate definition in the appended claims, the terms "upper," "lower," "up," "down," "upwards," "downwards," "inner," "outer," "inside," "outside," "inwardly," "outwardly," "interior," "exterior," "front," "rear," "back," "forwards," and "backwards," are used to describe features of the exemplary embodiments with reference to the positions of such features as displayed in the figures.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

As used herein, the term "dynamic" means an ability to update a program while the program is currently running or an ability to manipulate a signal while the signal is currently transmitting.

Additionally, the terms "client," "subject," and "user" are used interchangeably herein unless expressly stated otherwise.

Furthermore, the terms "electrically-connected microfluidic device" and "microfluidic device" are used interchangeably herein unless expressly stated otherwise.

Furthermore, when a reference number is given an "$i^{th}$" denotation, the reference number refers to a generic component, set, or embodiment. For instance, a microfluidic device termed "microfluidic device i" refers to the $i^{th}$ microfluidic device in a plurality of microfluidic devices (e.g., a microfluidic device 300-$i$ in a plurality of microfluidic device 300).

In the present disclosure, unless expressly stated otherwise, descriptions of devices and systems will include implementations of one or more computers. For instance, and for purposes of illustration in FIG. 1, a device 100 is represented as single device that includes all the functionality of the device 100. As discussed below in regard to FIG. 3, in some embodiments, the device 100 is implemented as a wearable device or a garment, such as a smart garment, that is configured to be worn by a user. However, the present disclosure is not limited thereto. For instance, in some embodiments, the functionality of the device 100 is spread across any number of networked computers and/or reside on each of several networked computers and/or by hosted on one or more virtual machines and/or containers at a remote location accessible across a communications network (e.g., communications network 106 of FIG. 1). One of skill in the art will appreciate that a wide array of different computer topologies is possible for the device 100, and other devices and systems of the preset disclosure, and that all such topologies are within the scope of the present disclosure. Moreover, rather than relying on a physical communications network 106, the illustrated devices and systems may wirelessly transmit information between each other. As such, the exemplary topology shown in FIG. 1 merely serves to describe the features of an embodiment of the present disclosure in a manner that will be readily understood to one of skill in the art.

FIG. 1 depicts a block diagram of a device (e.g., computer system) according to some embodiments of the present disclosure. In some embodiments, the device 100 includes or is operationally associated with one or more microfluidic devices of a plurality of microfluidic devices (e.g., microfluidic devices 300 of FIG. 3). In some embodiments, the device 100 at least facilitates communicating one or more instructions for generating and/or controlling an activation signal that provides haptic feedback utilizing the one or more microfluidic devices.

In some embodiments, the communication network 106 optionally includes the Internet, one or more local area networks (LANs), one or more wide area networks (WANs), other types of networks, or a combination of such networks. Examples of communication networks 106 include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

In various embodiments, the device 100 includes one or more processing units (CPUs) 102, a network or other communications interface 104, and memory 112.

In some embodiments, the device 100 includes a user interface 118. The user interface 118 typically includes a display 108 for presenting media. In some embodiments, the display 108 is integrated within the device (e.g., housed in the same chassis as the CPU 102 and memory 112). However, the present disclosure is not limited thereto. In some embodiments, the device 100 includes one or more input device(s) 110, which allow a subject to interact with the device 100. In some embodiments, input devices 110 include a keyboard, a mouse, and/or other input mechanisms. Alternatively, or in addition, in some embodiments, the display 108 includes a touch-sensitive surface (e.g., where display 108 is a touch-sensitive display or device 100 includes a touch pad).

In some embodiments, the device 100 presents media to a user through the display 108. Examples of media presented by the display 108 include one or more images, a video, audio (e.g., waveforms of an audio sample), or a combination thereof. In typical embodiments, the one or more images, the video, the audio, or the combination thereof is presented by the display 108 through a client application (e.g., client application 124 of FIG. 14). In some embodiments, the audio is presented through an external device (e.g., speakers, headphones, input/output (I/O) subsystem, etc.) that receives audio information from the device 100 and presents audio data based on this audio information. In some embodiments, the user interface 118 also includes an audio output device, such as speakers or an audio output for connecting with speakers, earphones, or headphones.

In some embodiments, the device 100 includes power system 114, which optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management, and distribution of power in devices. In some embodiments, such as various embodiments where a housing is integrated with the device 100, a battery, a control circuit (e.g., controller 304 of FIG. 3), and network interface 104 are components of the device 100.

In some embodiments, the device 100 also includes one or more of: one or more sensors 116 (e.g., accelerometer, magnetometer, proximity sensor, gyroscope, etc.). In some embodiments, the one or more sensors 116 include one or more hardware devices that detect spatial and motion information about the device 100. In some embodiments, the spatial and motion information includes information about a position of the device 100, an orientation of the device 100, a velocity of the device 100, a rotation of the device 100, an acceleration of the device 100, or a combination thereof. For instance, in some embodiments, the one or more sensors 116 include one or more inertial measurement units (IMUs) that a detect rotation of the head of the user while the user is wearing the device 100. In some embodiments, this rotation information is then used (e.g., by control module 122) to adjust the activation signal provided to the one or more microfluidic devices 300.

Memory 112 includes high-speed random access memory, such as DRAM, SRAM, DDR RAM, or other random access solid state memory devices, and optionally also includes non-volatile memory, such as one or more magnetic disk storage devices, optical disk storage devices, flash memory devices, or other non-volatile solid state storage devices. Memory 112 may optionally include one or more storage devices remotely located from the CPU(s) 102. Memory 112, or alternatively the non-volatile memory device(s) within memory 112, includes a non-transitory computer readable storage medium. Access to memory 112 by other components of the device 100, such as the CPU(s) 112, is, optionally, controlled by a controller. In some embodiments, memory 112 can include mass storage that is remotely located with respect to the CPU(s) 102. In other words, some data stored in memory 112 may in fact be hosted on devices that are external to the device 100, but that can be electronically accessed by device 100 over an Internet, intranet, or other form of network 106 or electronic cable using communication interface 104.

In some embodiments, the memory 112 of the device 100 stores:
- an operating system 120 (e.g., ANDROID, iOS, DARWIN, RTXC, LINUX, UNIX, OS X, WINDOWS, or an embedded operating system such as VxWorks) that includes procedures for handling various basic system services;
- an electronic address associated with the device 100 that identifies the device 100 (e.g., within the communication network 106);
- a control module 122 for controlling one or more microfluidic devices (e.g., microfluidic device 300-1 of FIG. 3) in communication with the device 100; and
- optionally, a client application for presenting information (e.g., media) using a display 108 of the device 100.

As illustrated in FIG. 1, a device 100 preferably includes an operating system 120 that includes procedures for handling various basic system services. The operating system 120 (e.g., iOS, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.), and facilitates communication between various hardware and software components.

In some embodiments, an electronic address is associated with the device 100. The electronic address is utilized to at least uniquely identify the device 100 from other devices and components, such as other devices and components of a distributed computer system associated with the device 100 or those having access to the communications network 106.

Figure 3:
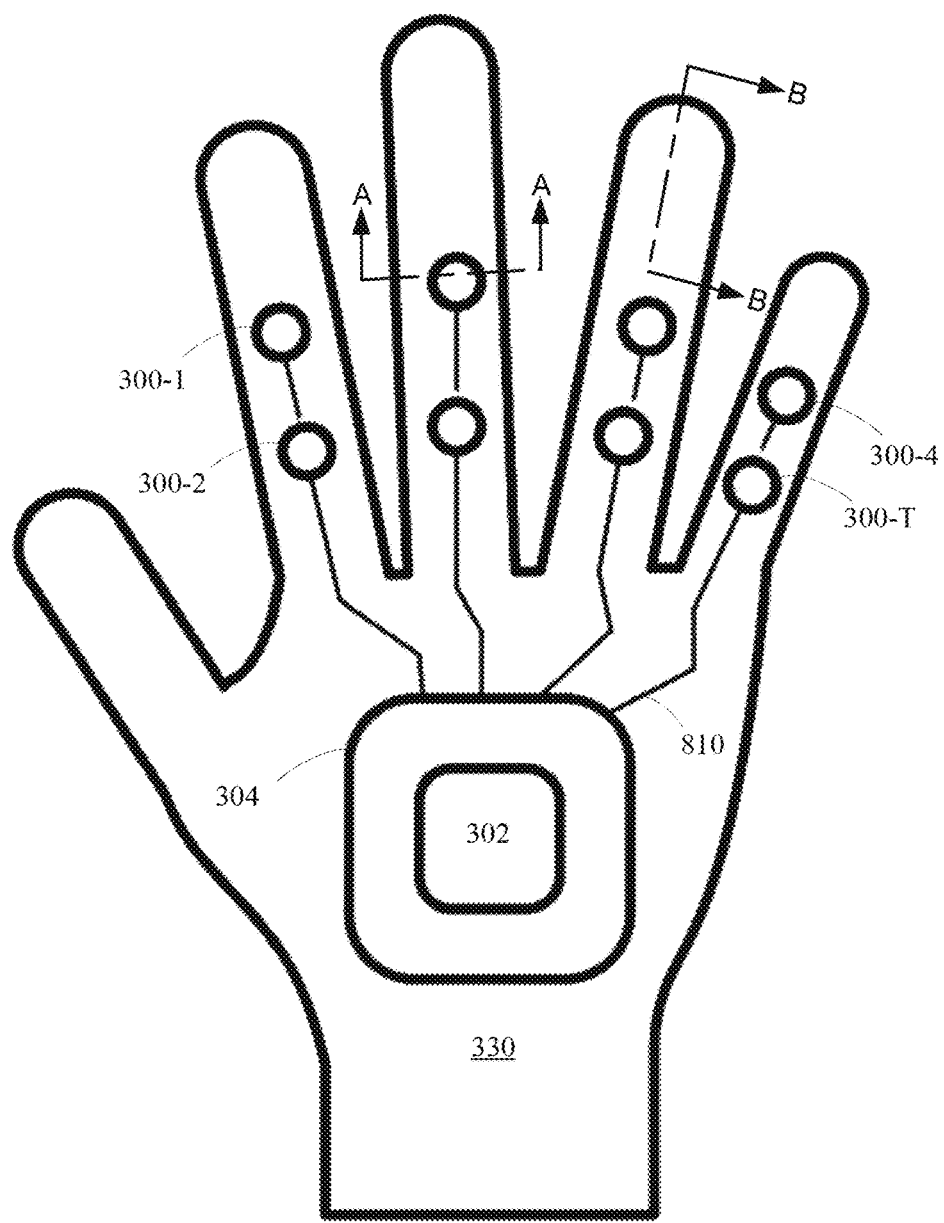
FIG. 3 illustrates a device including a plurality of electrically-connected microfluidic devices, in accordance with an embodiment of the present disclosure.
Figure 4:
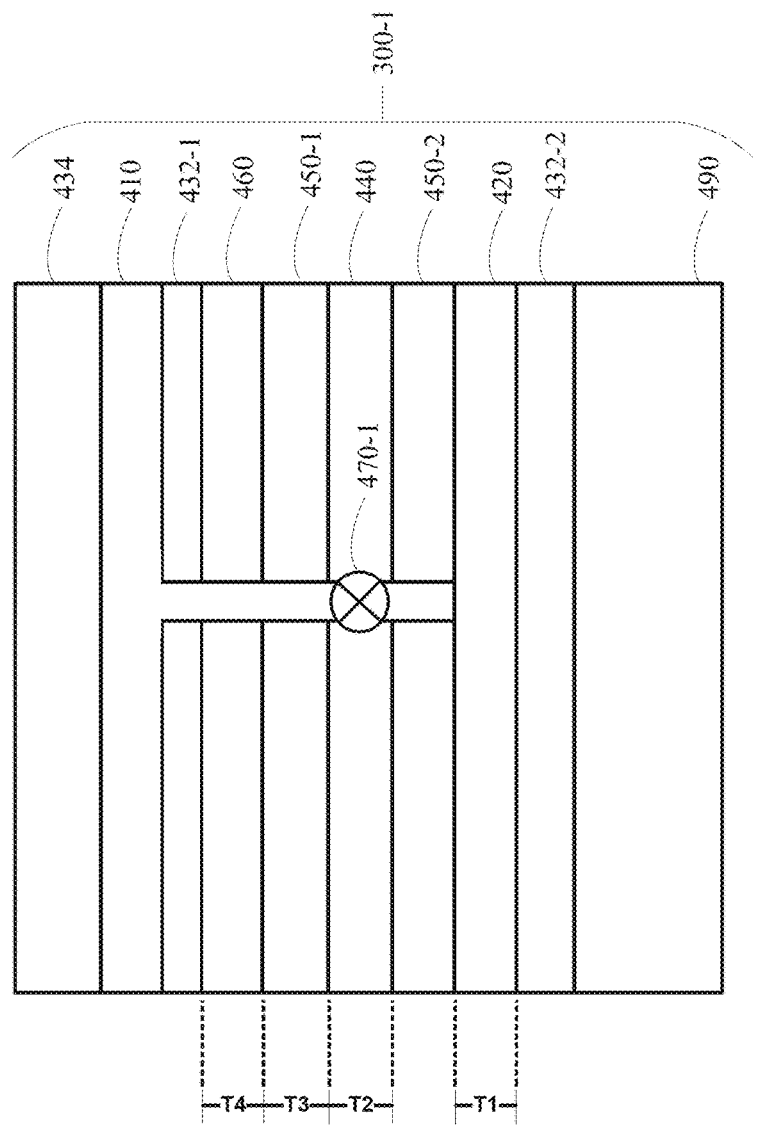
FIG. 4 illustrates a microfluidic device, in accordance with an embodiment of the present disclosure.

In some embodiments, a control module 122 is configured to facilitate control of each microfluidic device in a plurality of microfluidic devices (first microfluidic device 300-1 of FIG. 3, second microfluidic device 300-2 of FIG. 3, third microfluidic device 300-3 of FIG. 3, microfluidic device T 300-T of FIG. 3, first microfluidic device 300-1 of FIG. 4, etc.). For instance, in some such embodiments, the control module 122 is configured to generate or provide an activation signal for activating a first microfluidic device 300-1 in the plurality of microfluidic devices. For instance, in some embodiments, the control module 122 allows the device 100 to operate in conjunction with a digital reality scene (e.g., a computer system configured to host the digital reality scene). As a non-limiting example, in some embodiments, the control module 122 receives information from one or more sensors (e.g., sensor 116 of FIG. 1) associated with evaluating a state of the user interacting with the digital reality scene. In some embodiments, based on the received information, the control module 122 generates the activation signal for activating one or more microfluidic devices 300 in a plurality of microfluidic devices 300 in order to facilitate haptic feedback. For example, if the control module 122 receives information (e.g., a signal) associated with the digital reality scene indicating the user hits a wall (e.g., an object in the digital reality scene), the control module 122 generates the activation signal for activating the one or more microfluidic devices 300 to cause a displacement of a surface associated with the one or more microfluidic devices. As a non-limiting example, in some embodiments, a first subset in the plurality of microfluidic devices 300 is activated by a first activation signal to stimulate a human first striking a wooden wall, a second subset in the plurality of microfluidic devices 300 is activated by a second activation signal to stimulate a human first hitting a Plexiglas wall, which would be different from the stimulation generated for the wooden wall. However, the present disclosure is not limited thereto. In some embodiments, the control module 122 is configured to generate and/or provide the activation signal in order to facilitate synchronized haptic feedback, audio feedback, visual feedback, or a combination thereof when the user is interacting with the digital reality environment.

In some embodiments, the control module 122 includes one or more logical operation (e.g., logical functions of FIG. 10). In some embodiments, referring briefly to chart 1000 of FIG. 10, the one or more logical operation is based on some Boolean operation. For instance, in some embodiments, a first logical operation describes an "AND" Boolean operation that requires both elements of the first logical operation to be satisfied for a respective threshold to be deemed satisfied. A second logical operation describes an "OR" Boolean operation that requires any one element of the second logical operation to be satisfied for a respective threshold to be deemed satisfied. Moreover, a third logical operation describes an "EXCLUSIVE OR (XOR)" Boolean operation that requires any one element of the third logical operation to be satisfied and no other element satisfied for a respective threshold to be deemed satisfied. A fourth logical operation describes a singular "NOT" Boolean operation that requires absence of an element of the fourth logical operation to be satisfied for a respective threshold to be deemed satisfied. A fifth logical operation describes a plural "NOT" Boolean operation that requires both absence of a first element and presence of a second element of the fifth logical operation to be satisfied for a respective threshold to be deemed satisfied. In some embodiments, a logical operation of a respective model includes a combination of one or more of the above described logical operations. For instance, in some embodiments, a respective logical operation includes one or more AND, OR, XOR, or NOT operations within the respective logical operation that is utilized to control a subset of a plurality of microfluid devices 300 associated with the device 100. However, the present disclosure is not limited thereto.

In some embodiments, the control model 122 includes, or is implemented as, an artificial intelligence engine. For instance, in some embodiments, the control model 122 includes one or more models such as one or more gradient boosting models, one or more random forest models, one or more neural networks (NN), one or more regression models, one or more Naïve Bayes models, one or more machine learning algorithms (MLA), or a combination thereof. In some embodiments, an MLA or a NN is trained from a training data set that includes one or more features identified from a data set. MLAs include supervised algorithms (such as algorithms where the features/classifications in the data set are annotated) using linear regression, logistic regression, decision trees, classification and regression trees, Naïve Bayes, nearest neighbor clustering; unsupervised algorithms (such as algorithms where no features/classification in the data set are annotated) using a priori, means clustering, principal component analysis, random forest, adaptive boosting; and semi-supervised algorithms (such as algorithms where an incomplete number of features/classifications in the data set are annotated) using generative approach (such as a mixture of Gaussian distributions, mixture of multinomial distributions, hidden Markov models), low density separation, graph-based approaches (such as minimum cut, harmonic function, manifold regularization, etc.), heuristic approaches, or support vector machines.

NNs include conditional random fields, convolutional neural networks, attention based neural networks, deep learning, long short term memory networks, or other neural models.

While MLA and neural networks identify distinct approaches to machine learning, the terms may be used interchangeably herein. Thus, a mention of MLA may include a corresponding NN or a mention of NN may include a corresponding MLA unless explicitly stated otherwise. In some embodiments, the training of a respective model includes providing one or more optimized datasets, labeling these features as they occur, and training the MLA to predict or classify based on new inputs, such as based on data captured when a user is interacting with a digital reality scene including meta data of the digital reality scene and/or biometric data associated with the user. Artificial NNs are efficient computing models which have shown their strengths in solving hard problems in artificial intelligence. For instance, artificial NNs have also been shown to be universal approximators, that is, they can represent a wide variety of functions when given appropriate parameters.

Accordingly, in some embodiments, a first model is a neural network classification model, a second model is a Naïve Bayes classification model, and the like. Furthermore, in some embodiments, the model includes a decision tree algorithm, a neural network algorithm, a support vector machine (SVM) algorithm, and the like. Moreover, in some embodiments, the model used in the methods (e.g., method 200 of FIG. 2) described herein is a logistic regression algorithm, a neural network algorithm, a convolutional neural network algorithm, a support vector machine (SVM) algorithm, a Naive Bayes algorithm, a nearest neighbor algorithm, a boosted trees algorithm, a random forest algorithm, a decision tree algorithm, a clustering algorithm, or a combination thereof.

One of skill in the art will readily appreciate other models that are applicable to the systems and methods of the present disclosure. In some embodiments, the systems and methods of the present disclosure utilize more than one model to provide an evaluation (e.g., arrive at an evaluation given one or more inputs) with an increased accuracy. For instance, in some embodiments, each respective model arrives at a corresponding evaluation when provided a respective data set. Accordingly, each respective model can independently arrive and a result and then the result of each respective model is collectively verified through a comparison or amalgamation of the models. From this, a cumulative result is provided by the models. However, the present disclosure is not limited thereto.

In some embodiments, the control module 122 is tasked with performing a corresponding activity, such as to perform one or more steps of a method of the present disclosure (e.g., method 200 of FIG. 2). As a non-limiting example, in some embodiments, the control module is tasked to perform a task including providing an activation signal for activating a first microfluidic device 300-1 of a plurality of electrically-connected microfluidic devices 300 (e.g., block 202 of FIG. 2) and/or electrically actuating a piezoelectric actuator (e.g., piezoelectric actuator 440 of FIG. 4) of the microfluidic device 300 (e.g., block 204 of FIG. 2).

Referring to FIG. 3, in some embodiments, the control module 122 is embedded within an application-specific integrated circuit (ASIC) (e.g., ASIC 302 of FIG. 3). However, the present disclosure is not limited thereto.

Each of the above identified modules and applications correspond to a set of executable instructions for performing one or more functions described above and the methods described in the present disclosure (e.g., the computer-implemented methods and other information processing methods described herein; method 200 of FIG. 2; etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 112 optionally stores a subset of the modules and data structures identified above. Furthermore, in some embodiments, the memory 112 stores additional modules and data structures not described above.

It should be appreciated that the device of FIG. 1 is only one example of a device 100, and that the device 100 optionally has more or fewer components than shown, optionally combines two or more components, or optionally has a different configuration or arrangement of the components. The various components shown in FIG. 1 are implemented in hardware, software, firmware, or a combination thereof, including one or more signal processing and/or application specific integrated circuits.

Referring to FIG. 3, a front view of a device 100 according to various embodiments of the present disclosure is provided. In some embodiments, the device 100 is a garment, such as a smart garment, that is configured to be worn by a user. As a non-limiting example, in some embodiments, the device 100 is a glove, a helmet, a belt, a jacket, a pair of pants, a shoe, a sock, a shirt, or the like. However, the present disclosure is not limited thereto.

The device 100 includes a substrate (e.g., substrate 330 of FIG. 3). In some embodiments, the substrate is a body of the device 100, such as a fabric substrate of the device 100 configured as a glove that is worn by a user. However, the present disclosure is not limited thereto. The substrate 330 includes one or more layers such as a first layer (e.g., first layer 432-1 of FIG. 4, first layer 432-1 of FIG. 5, etc.). In some embodiments, the one or more layers 432 include and a second layer (e.g., second layer 432-2 of FIG. 4, second layer 432-2 of FIG. 5, etc.). In some embodiments, the first layer is an outer layer of the substrate and the second layer is an inner layer.

Furthermore, the device includes a plurality of electrically-connected microfluidic devices embedded within the first and second layers of the substrate. In some embodiments, the plurality of electrically-connected microfluidic devices is embedded at one or more positions within the substrate. For instance, in some embodiments, a respective electrically-connected microfluidic device in the plurality of electrically-connected microfluidic devices is embedded at a finger portion of the substrate 330, a palmar portion of the substrate 330, a wrist portion of the substrate 330, a dorsal portion of the substrate 330, or a combination thereof.

Figure 5:
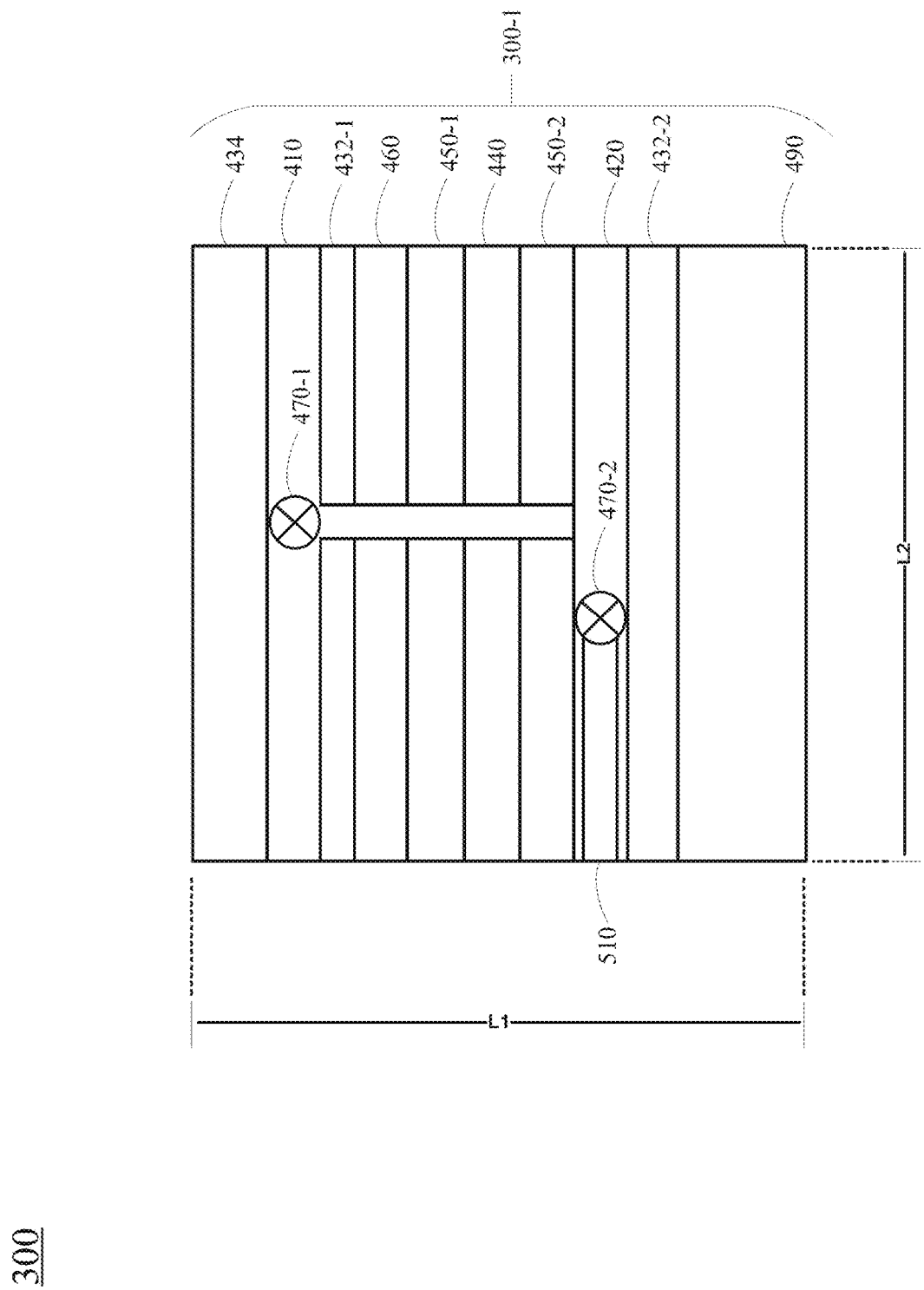
FIG. 5 illustrates another microfluidic device, in accordance with an embodiment of the present disclosure.

Referring briefly to FIG. 5, in some embodiments, a first length L1 of a respective microfluidic device 300 in the plurality of electrically-connected microfluidic devices 300 is in a range of from 0.3 mm to about 2.2 mm, from 0.4 mm to about 2.1 mm, from 0.5 mm to about 2.0 mm, from 0.6 mm to about 1.9 mm, from 0.8 mm to about 1.7 mm, from 1.0 mm to about 1.5 mm, or from 1.1 mm to about 1.2 mm. In some embodiments, the first length L1 of the respective microfluidic device 300 is about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0.

In some embodiments, a second length L2 (e.g., a width, a depth) of the respective microfluidic device 300 in the plurality of electrically-connected microfluidic devices 300 is in a range of from 0.3 mm to about 2.2 mm, from 0.4 mm to about 2.1 mm, from 0.5 mm to about 2.0 mm, from 0.6 mm to about 1.9 mm, from 0.8 mm to about 1.7 mm, from 1.0 mm to about 1.5 mm, or from 1.1 mm to about 1.2 mm. In some embodiments, the second length L2 of the respective microfluidic device 300 is about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0. In some embodiments, the first length L1 and the second length L2 of the respective microfluidic device 300 is the same or substantially the same.

In some embodiments, a dimension of the respective microfluidic device 300 is configured based on a position of the respective microfluidic device embedded in the substrate 330. As a non-limiting example, in some embodiments, a first microfluidic device 300-1 in the plurality of microfluidic devices 300 has a first dimension (e.g., first length L1) of about 0.5 mm and is embedded in the substrate 330 near a first portion of the device 100 (e.g., an index finger of a glove device 100 of FIG. 3), and a second microfluidic device 300-2 in the plurality of microfluidic devices 300 has a second dimension (e.g., first length L1) of about 1.5 mm and is embedded in the substrate 330 near a second portion of the device 100 (e.g., a write of the glove device 100 of FIG. 3), in which the second portion is different than the first portion of the device 100. However, the present disclosure is not limited thereto.

Figure 8A:
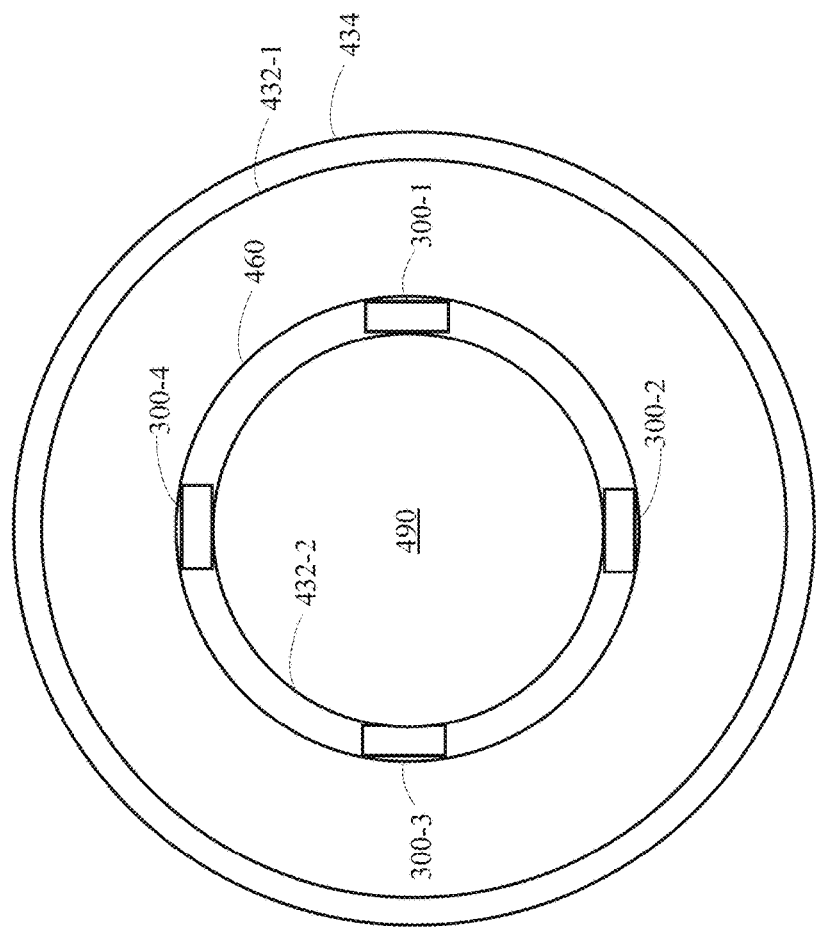
FIG. 8A illustrates a cross-sectional view taken along lines A-A of FIG. 3, in accordance with an embodiment of the present disclosure.
Figure 8B:
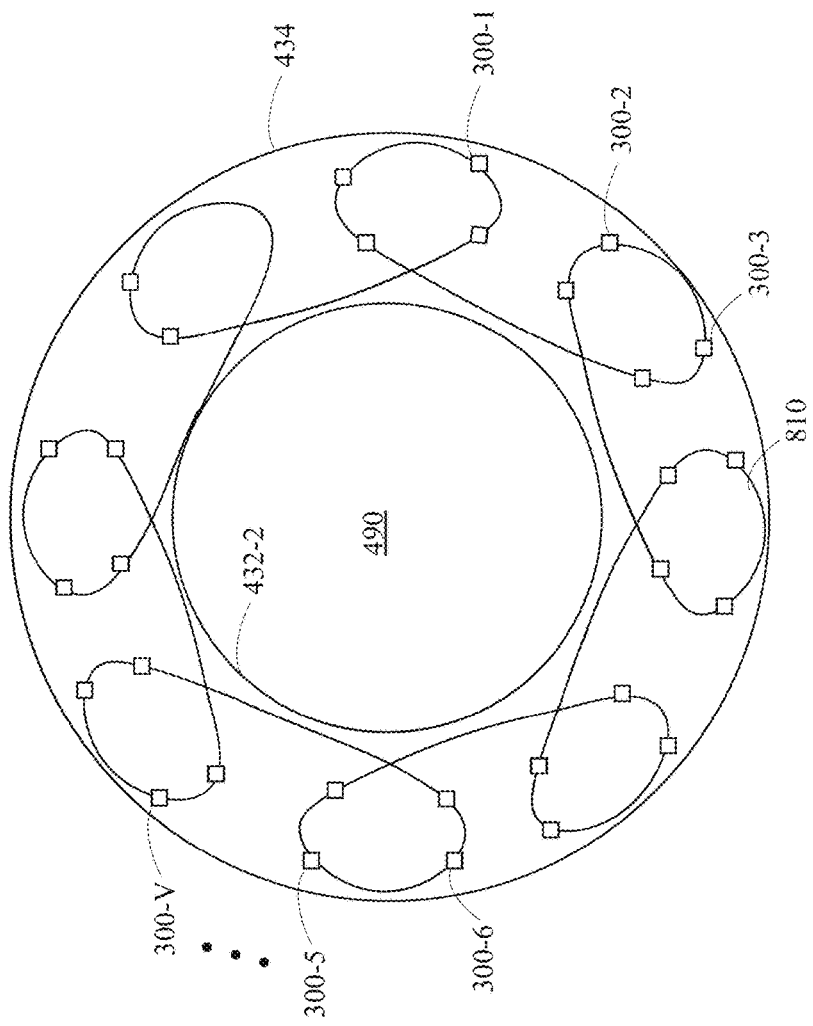
FIG. 8B illustrates another cross-sectional view taken along lines A-A of FIG. 3, in accordance with an embodiment of the present disclosure.

Referring to FIG. 8B, in some embodiments, the plurality of electrically-connected microfluidic devices 300 is arranged in a pattern, which allows for generating a corresponding plurality of displacements in a pattern based on the arrangement of the plurality of electrically-connected microfluidic devices 300. For instance, in some embodiments, the plurality of electrically-connected microfluidic devices 300 is arranged in a helical pattern (e.g., one or more spirals, one or more loops, one or more ring, etc.) that surrounds a body of a user, such as a finger of the user (e.g., first microfluidic device 300-1, second microfluidic device 300-2, . . . , microfluidic device 300-V of FIG. 8A). As a non-limiting example, in some embodiments, the helical pattern allows for the plurality of electrically-connected microfluidic devices 300 to create a three-dimensional kinesthetic force pattern (e.g., a water simulation pattern) on the body of the user, such as a simulation of water passing through by the body of the user. In some embodiments, the helical pattern is utilized isotopically actuate the plurality of electrically-connected microfluidic devices 300, which allows for the user to feel a uniform force, or a displacement, in response to an activation signal (e.g., block 202 of FIG. 2). Furthermore, in some embodiments, the pattern is a concentric circle pattern. In some embodiments, each circle in the concentric circle pattern includes a corresponding subset of the plurality of microfluidic devices 300. In some embodiments, the concentric circle pattern includes two or more circles, three or more circles, four or more circles, five or more circles, or seven or more circles. Moreover, in some such embodiments, each circle in the concentric circle pattern (e.g., each corresponding subset of the plurality of microfluidic devices 300) is individually activated based on the activation signal. However, the present disclosure is not limited thereto.

Figure 9:
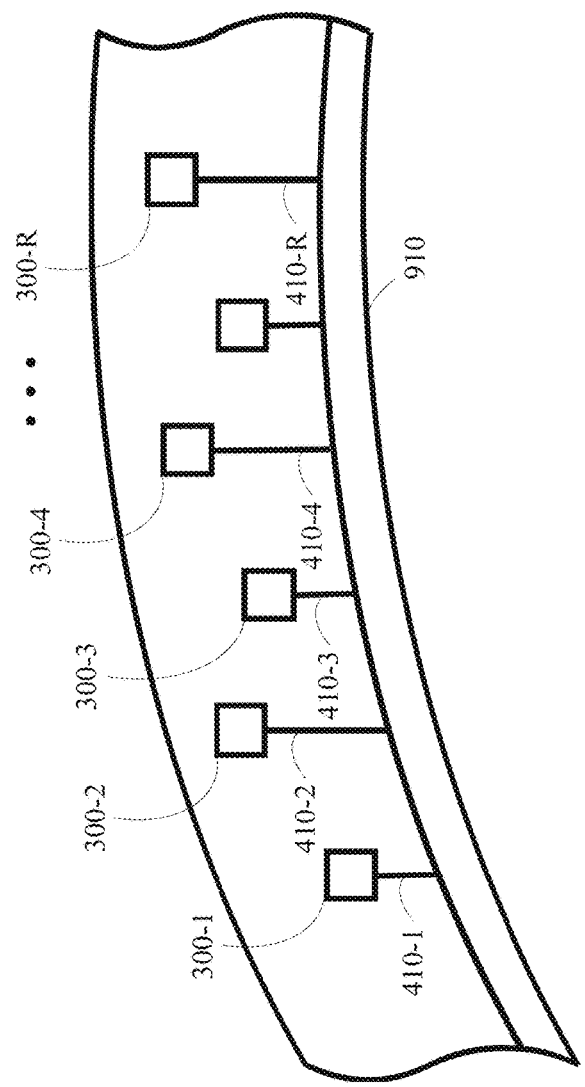
FIG. 9 illustrates a cross-sectional view taken along lines B-B of FIG. 3, in accordance with an embodiment of the present disclosure.

Referring to FIG. 9, in some embodiments, the plurality of electrically-connected microfluidic devices 300 is arranged in a pattern, which allows forming a memory array, such as a first memory array having a plurality of rows and a plurality of columns associated with at least one or more wordlines and one or more bitlines. For instance, in some embodiments, a control module (e.g., control module 122 of FIG. 1, ASIC 302 of FIG. 3, etc.) facilitates addressing the memory array when providing an activation signal using one or more NAND logic operations. For instance, in some embodiments, each microfluidic device 300 in the memory array is activatable, for example by applying suitable voltages via the activation signal, to the respective wordline. However, the present disclosure is not limited thereto.

Figure 6:
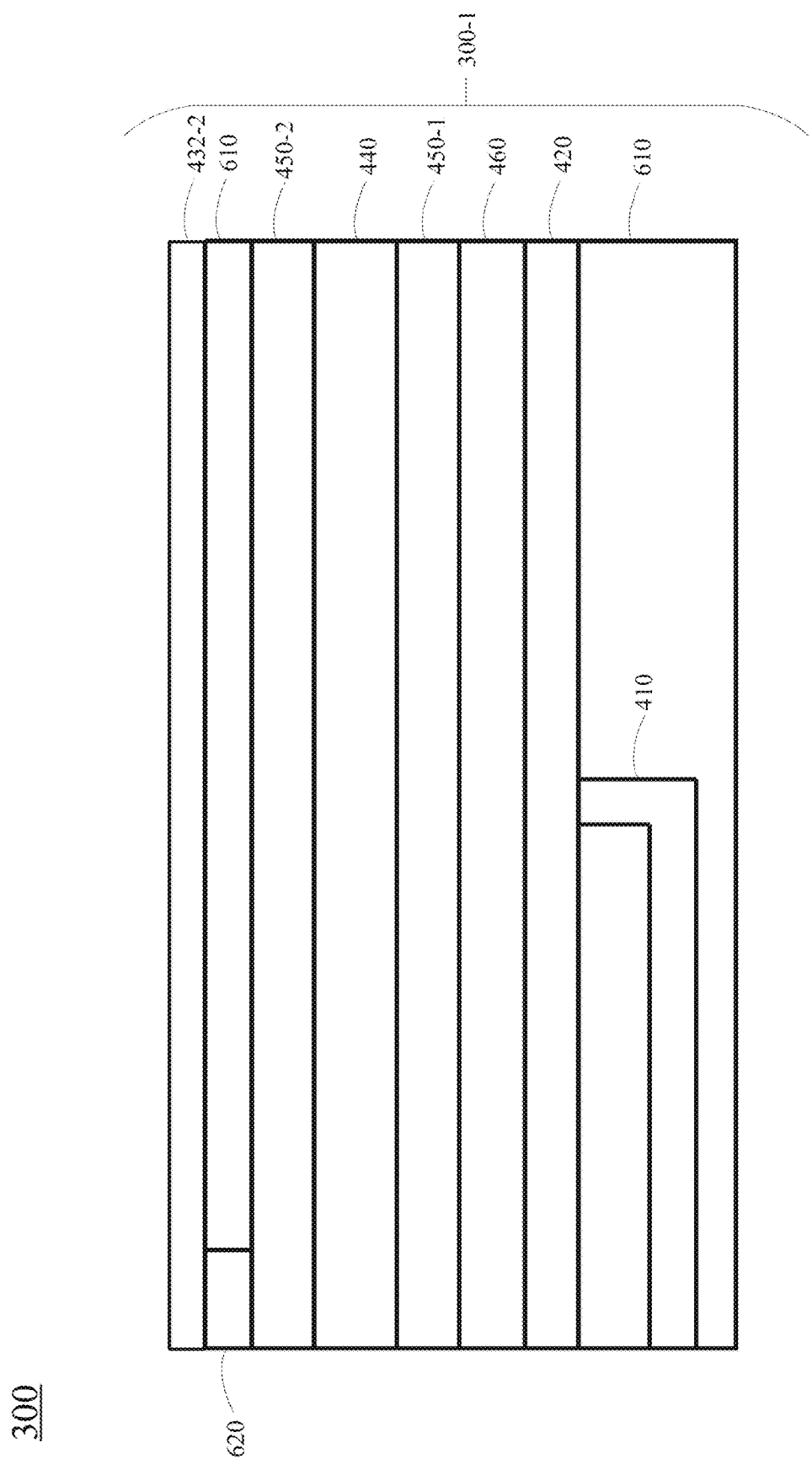
FIG. 6 illustrates yet another microfluidic device, in accordance with an embodiment of the present disclosure.
Figures 7A, 7B:
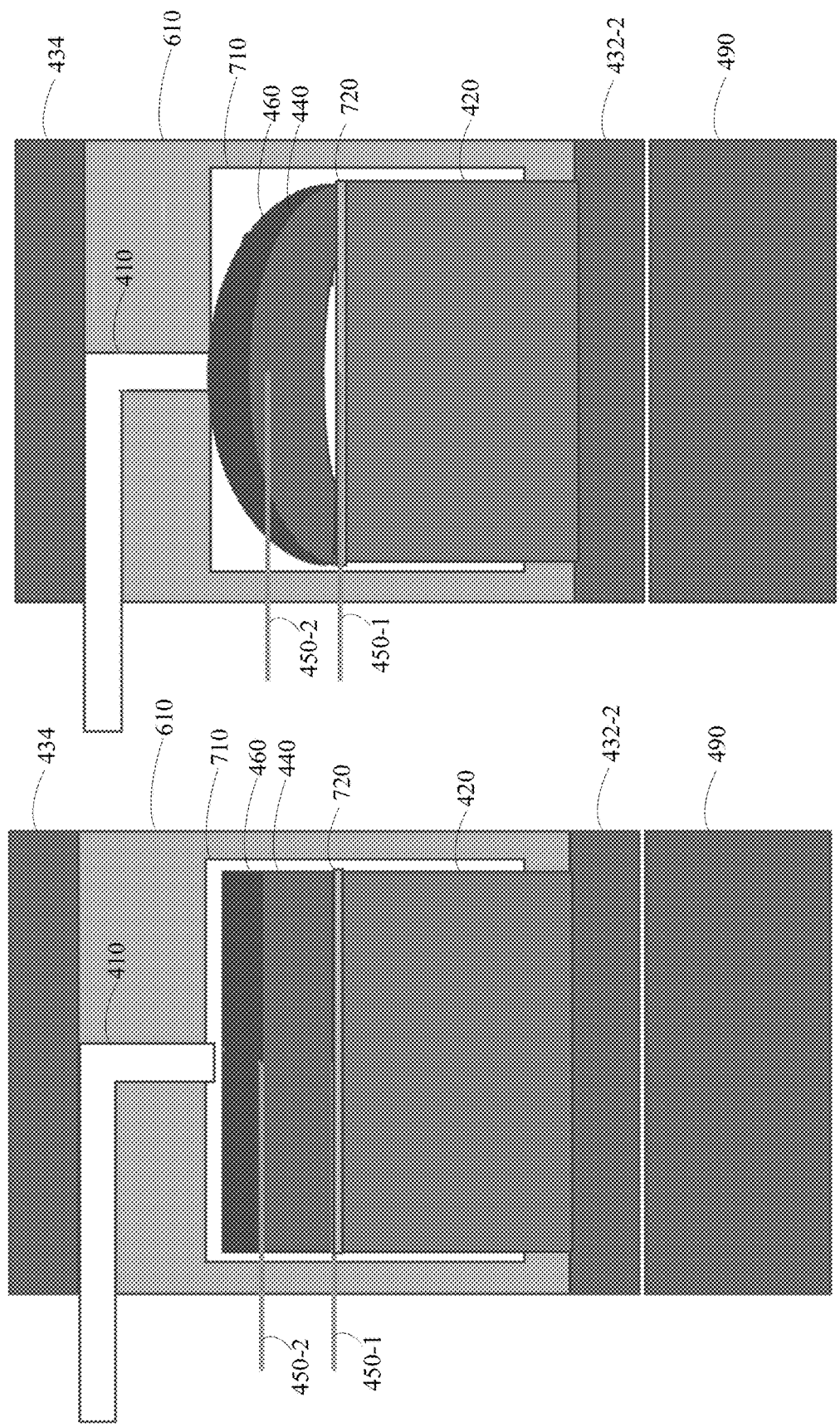
FIG. 7A illustrates a microfluidic device including an inlet port configured in an OPEN state.
FIG. 7B illustrates another microfluidic device including an inlet port configured in a CLOSED state.

Moreover, each microfluidic device of the plurality of electrically-connected microfluidic devices includes an inlet port (e.g., inlet port 410 of FIG. 4, inlet port 410 of FIG. 5, inlet port 410 of FIG. 6, inlet port 410 of FIG. 7A, inlet port 410 of FIG. 7B, inlet port 410-1 of FIG. 9, inlet port 410-2 of FIG. 9, . . . , inlet port 410-R of FIG. 9, etc.). In some embodiments, the inlet port 410 is configured for supplying a fluid into the respective microfluidic device. For instance, in some embodiments, the inlet port 410 is configured to supply the fluid into a cavity (e.g., cavity 710 of FIG. 7A, cavity 710 of FIG. 7B, etc.) of the respective microfluidic device. In some such embodiments, the cavity is configured to accommodate the tube 420, such that the inlet port 410 supplies to the fluid to the tube 420. However, the present disclosure is not limited thereto.

In some embodiments, the fluid is a liquid or a gas. As a non-limiting example, in some embodiments, the fluid includes water. In some embodiments, the fluid is a hydrophobic fluid, such as an oil (e.g., mineral oil). In some embodiments, the fluid is an inert gas, such as helium, neon, argon, krypton, xenon, radon, or a combination thereof. In some embodiments, the fluid is atmospheric air (e.g., the fluid includes about 78 volume percent nitrogen, about 21 volume percent oxygen, etc.). However, the present disclosure is not limited thereto. In some embodiments, the fluid is a pressurized fluid, such that a first pressure of the fluid (e.g., a pressure of the device when the first actuator 470-1 is OPEN) is greater than 1 atmosphere (atm) of pressure. Accordingly, by controlling a pressure of the fluid received by the microfluidic device 300, the device 300 is capable of controlling the fluid in order to cause a displacement of a surface of the substrate 330, such as to provide a vibration perception for a user of the device 100.

Accordingly, referring to FIG. 9, in some embodiments, the device 100 includes a manifold (e.g., manifold 910 of FIG. 9) configured to distribute a supply of the fluid to each microfluidic device 300 in the plurality of microfluidic devices 300. In some embodiments, the manifold 910 includes one or more channels that is in fluidic communication with each corresponding inlet port 410 of a respective microfluidic device 300 in the plurality of microfluidic devices 300. Moreover, referring to FIG. 3, in some embodiments, the manifold is in communication with a fluid reservoir (e.g., fluid reservoir 304 of FIG. 3), that is configured to store a supply of the fluid and/or ensure the supply of the fluid is at optimal levels to facilitate for supplying the fluid into each microfluidic device 300.

In some embodiments, the microfluidic device 300 further includes a first actuator (e.g., first actuator 470-1 of FIG. 4, first actuator 470-1 of FIG. 5, etc.). In some embodiments, the first actuator 470-1 is configured for controlling an amount (e.g., a volume, a mass flowrate, etc.) of the fluid that supplied to a tube 420 via the inlet port 410. For instance, in some embodiments, the first actuator 470-1 is configured between an OPEN state that allow for the flow of the fluid within the microfluidic device 300 and an OFF State that retards or arrests the flow of the fluid within the microfluidic device 300. However, the present disclosure is not limited thereto. In some embodiments, the first actuator 470-1 is an active valve. In some embodiments, the first actuator 470-1 is a passive valve.

Furthermore, each microfluidic device 300 of the plurality of electrically-connected microfluidic devices 300 includes a tube (e.g., tube 420 of FIG. 4, tube 420 of FIG. 5, tube 420 of FIG. 6, tube 420 of FIG. 7A, tube 420 of FIG. 7B) that is configured for receiving the fluid from the inlet port 300. Accordingly, in some such embodiments, the tube 420 is in fluidic communication with the inlet port 410 of the microfluidic device 300.

In some embodiments, the tube has a first thickness (T1) in a range of from about 25 microns (μm) to about 150 μm, from about 35 μm to about 140 μm, from about 40 μm to about 130 μm, from about 45 μm to about 120 μm, from about 45 μm to about 110 μm, from about 50 mm to about 100 mm, from about 60 mm to about 90 mm, or from about 70 mm to about 85 mm. In some embodiments, the thickness of the tube is about 50 μm, about 75 μm, about 100 μm, about 125 μm, about 150 μm, about 175 μm, about 200 μm, about 225 μm, about 250 μm, about 275 μm, about 300 μm, about 325 μm, about 350 μm, about 375 μm, about 400 μm, about 425 μm, about 450 μm, about 475 μm, about 500 μm, about 525 μm, about 550 μm, or about 575 μm. In some embodiments, the first thickness of the tube 420 is a diameter, such as a hydraulic diameter, of the tube 420. However, the present disclosure is not limited thereto.

In some embodiments, the tube 420 includes a material configured to absorb and/or desorb a fluid. In some embodiments, the absorption and/or desorption by the tube 420 is selective for the fluid, which allows for providing the tube 420 with variable, or dynamic, stiffness. As a non-limiting example, in some embodiments, the tube 420 includes a carbon nanotube, which has a loading effect as a function of a pressure of the fluid in order to provide selective control of absorption and/or desorption by the carbon nanotube. By selecting controlling the absorption and/or desorption of the fluid by the tube 420, the microfluidic device 300 is capable of exerting a force of a body 490 of the user in order to simulate feeling a material in a digital reality scene, such as a feeling of touching a different material than that of the substrate 330. Additional details and information regarding the carbon nanotube is found at Amand et al., 2005, Select Gas Absorption in Carbon Nanotubes Loading a Resonant Cavity to Sense Airborne Toxin Gases," Nuclear Instruments and Methods in Physics Research Section B: Beam Interactions with Materials and Atoms, 241(1-4), pg. 511-6, which is hereby incorporated by reference in its entirety for all purposes.

The device 100 further includes a piezoelectric actuator (e.g., piezoelectric actuator 440 of FIG. 4). In some embodiments, the piezoelectric actuator 440 is utilized for controlling an amount of the fluid supplied to the tube 420. For instance, referring to FIGS. 7A and 7B, via the inlet port, such as based on the activation signal. For instance, in some embodiments, the piezoelectric actuator 440 includes the first actuator 470-1. Accordingly, with the fluid supplied to the tube via the inlet port, a displacement of a portion of the first layer or the second layer of the substrate is realized.

In some embodiments, the piezoelectric actuator 440 has a second thickness (T2) in a range of from about 50 microns (μm) to about 700 μm, from about 75 μm to about 600 μm, from about 100 μm to about 500 μm, from about 150 μm to about 400 μm, or from about 200 μm to about 300 μm. In some embodiments, the second thickness of the piezoelectric actuator 440 is about 50 μm, about 75 μm, about 100 μm, about 125 μm, about 150 μm, about 175 μm, about 200 μm, about 225 μm, about 250 μm, about 275 μm, about 300 μm, about 325 μm, about 350 μm, about 375 μm, about 400 μm, about 425 μm, about 450 μm, about 475 μm, about 500 μm, about 525 μm, about 550 μm, or about 575 μm.

Figure 8C:
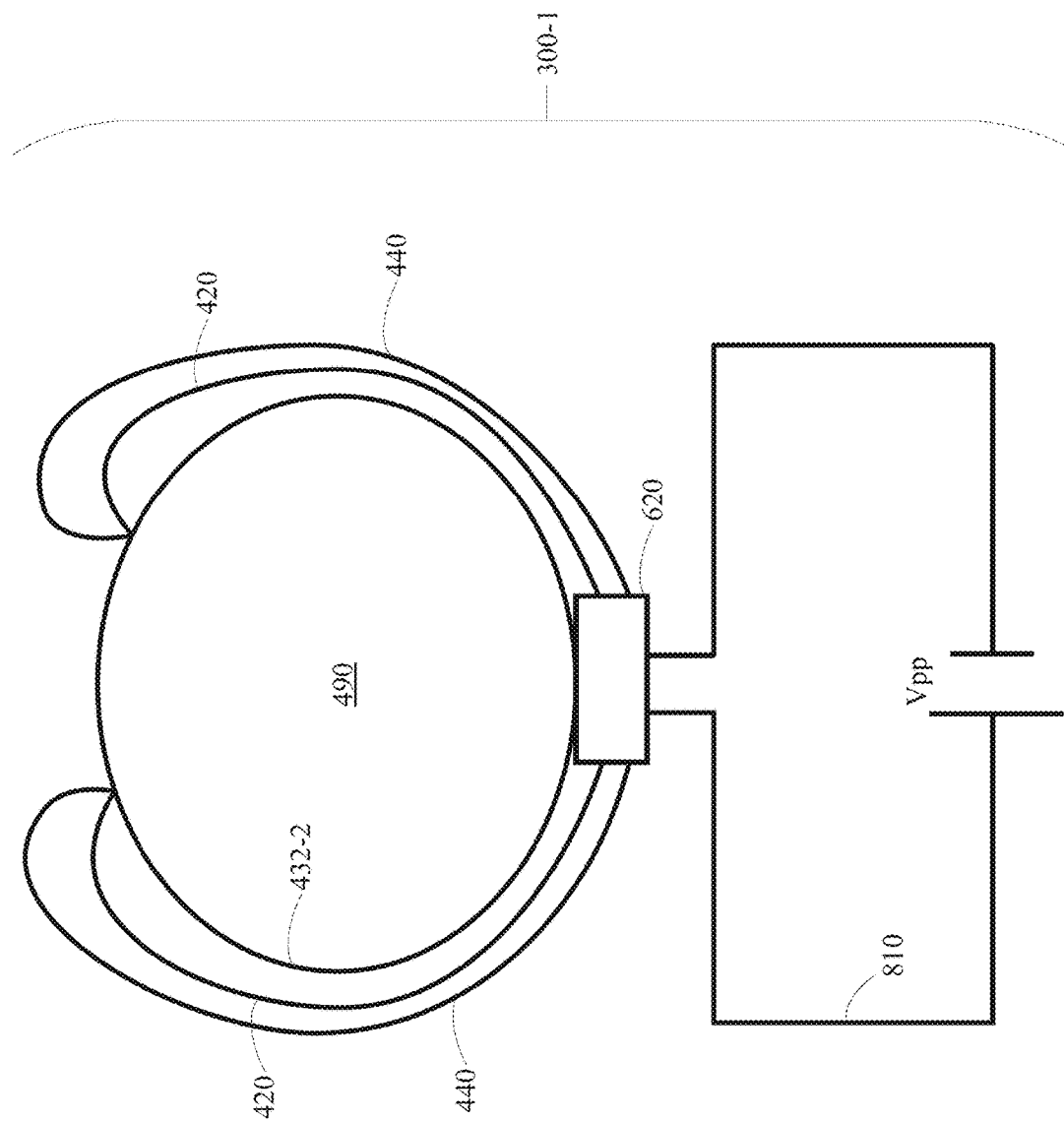
FIG. 8C illustrates yet another cross-sectional view taken along lines A-A of FIG. 3, in accordance with an embodiment of the present disclosure.

In some embodiments, the tube 420 is arranged closer to a substrate surface (e.g., second surface 432-2) that is to realize a displacement than the piezoelectric actuator 440. For instance, referring briefly to FIG. 5, the tube 420 is disposed proximate to a body 490 of the user. In some embodiments, the tube 420 is disposed adjacent to, or interfaces with, the second layer 432-2 of the substrate 330. Referring briefly to FIG. 8C, furthermore, in some embodiments, the tube 420 is arranged between the piezoelectric actuator 440 and either of the first layer 432-1 or the second layer 432-2 of the substrate 330. In some such embodiments, a structure of the microfluidic device 300 of FIG. 8C allows for the device 100 to achieve a high density of microfluidic devices embedded within the substrate 330 with a low weight to provide displacement of a small surface area. Moreover, referring briefly to FIG. 4, in some embodiments, the tube 420 is disposed interposing between the second layer 432-2 of the substrate 330 and the piezoelectric actuator 440. Additionally, in some such embodiments, the piezoelectric actuator 440 is arranged closer to a substrate surface (e.g., outer layer 434 of FIG. 4, outer layer 434 of FIG. 5, second layer 432-2 of FIG. 6, outer layer 434 of FIG. 7A, outer layer 434 of FIG. 7B, etc.) that is to realize the displacement than the tube 420.

In some embodiments, the displacement of the portion of the first layer 432-1 or the second layer 432-2 of the substrate 330 is in a range of from about 0.3 millimeters (mm) to about mm, from about 0.4 mm to about 9 mm, from about 0.4 mm to about 8 mm, from about 0.5 mm to about 7 mm, from about 1 mm to about 6 mm, from about 1.5 mm to about 5 mm, or from about 2 mm to about 3 mm. In some embodiments, the displacement of the portion of the first layer 432-1 or the second layer 432-2 of the substrate 330 is about 0.5 mm, about 1.25 mm, about 1.5 mm, about 1.75 mm, about 2 mm, about 2.25 mm, about 2.5 mm, about 2.75 mm, about 3 mm, about 4.25 mm, about 4.5 mm, about 4.75 mm, about 5 mm, about 5.25 mm, about mm, about 5.75 mm, about 6 mm, about 6.25 mm, about 6.5 mm, about 6.75 mm, about 7 mm, about 7.25 mm, about 7.5 mm, about 7.75 mm, about 8 mm, about 8.25 mm, about 8.5 mm, about 8.75 mm, about 9 mm, about 9.25 mm, about 9.5 mm, about 9.75 mm, about 10 mm, about mm, about 10.5 mm, about 10.75 mm, or about 11 mm. In some embodiments, the displacement of the portion is a maximum displacement.

In some such embodiments, the portion corresponds to an area of the substrate 330 where the respective microfluidic device 300 is arranged. For instance, in some embodiments, the area is a surface area of the respective microfluidic device 300, such as the surface area of a first surface facing the first layer 432-1 or the second layer 432-2 of the substrate 330.

Moreover, in some such embodiments, the displacement is based on the amount of the fluid in the tube 240 and/or a pressure in in the tube 240.

In some embodiments, each microfluidic device 300 of the plurality of electrically-connected microfluidic devices 300 further includes a first electrode (e.g., first electrode 450-1 of FIG. 4, first electrode 450-1 of FIG. 5, first electrode 450-1 of FIG. 6, first electrode 450-1 of FIG. 7A, first electrode 450-1 of FIG. 7B, etc.) and a second electrode (e.g., second electrode 450-2 of FIG. 4, second electrode 450-2 of FIG. 5, second electrode 450-2 of FIG. 6, second electrode 450-2 of FIG. 7A, second electrode 450-2 of FIG. 7B, etc.). In some embodiments, the piezoelectric actuator 440 is disposed interposing between the first electrode 450-1 and the second electrode 450-2. Accordingly, in some such embodiments, the first electrode 450-1 and the second electrode 450-2 are configured for electrically actuating the respective piezoelectric actuator 440 that is arranged between the first electrode 450-1 and the second electrode 450-2.

In some embodiments, the microfluidic device 300 further includes an insulation layer (e.g., insulation layer 720 of FIG. 7A, insulation layer 720 of FIG. 7B, etc.). In some embodiments, the insulation layer 720 is arranged interposing between the tube 420 and the piezoelectric actuator 440. In some embodiments, the insulation layer 720 is arranged interposing between the tube 420 and the first electrode 450-1.

In some embodiments, the first electrode 450-1 and/or the second electrode 450-2 has a third thickness (T3) in a range of from about 2 microns (μm) to about 30 μm, from about 2.5 μm to about 25 μm, from about 3 μm to about 20 μm, from about 4 μm to about 18 μm, from about 5 μm to about 16 μm, from about 7 um to about 14 um, from about 9 um to about 12 um, or from about 10 um to about 11 um. In some embodiments, the third thickness T3 of the first electrode 450-1 and/or the second electrode 450-2 is about 2 μm, about 3 μm, about 4 μm, about μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, or about 23 μm.

In some embodiments, each microfluidic device 300 of the plurality of electrically-connected microfluidic devices 300 further includes an impedance layer (e.g., impedance layer 460 of FIG. 4, impedance layer 460 of FIG. 5, impedance layer 460 of FIG. 6, impedance layer 460 of FIG. 7A, impedance layer 460 of FIG. 7B, etc.). In some embodiments, the impedance layer 460 is configured for matching a first impedance of the tube 420 and/or a second impedance of the piezoelectric actuator 440.

In some embodiments, the impedance layer 460 has a fourth thickness (T4) in a range of from about 40 microns (μm) to about 250 μm, from about 45 μm to about 225 μm, from about 50 μm to about 200 μm, from about 60 μm to about 180 μm, from about 80 μm to about 160 μm, from about 100 μm to about 150 um, from about 115 um to about 140 um, or from about 120 um to about 135 um. In some embodiments, the fourth thickness T4 of the impedance layer 460 is about 40 μm, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, about 180 μm, about 190 μm, about 200 μm, or about 210 μm. In some embodiments, the fourth thickness T4 of the impedance layer 460 is the same or substantially the same as the first thickness T1 of the tube 420 and/or the second thickness T2 of the piezoelectric actuator 440. As a non-limiting example, in some embodiments, the first thickness T1 is between 50 um and 100 um, the second thickness T2 is between 100 and 500 um, the fourth thickness T4 is between 50 um and 200 um.

In some embodiments, the impedance layer is composed of Aluminum nitride (AlN) and/or Silicon carbide (SiC).

In some embodiments, each microfluidic device 300 of the plurality of electrically-connected microfluidic devices 300 further includes an outlet port (e.g., outlet port 510 of FIG. 5). In some embodiments, the outlet port is configured for allowing the fluid to flow out of the tube 420. For instance, in some embodiments, the outlet port 510 is changeable between at least an OPEN state configured to allow for allowing the fluid to flow out of the tube 420 and a CLOSED state configured for retarding or arresting the flow of flow out of the tube 420. However, the present disclosure is not limited there.

In some embodiments, the microfluidic device 300 further includes a second actuator (e.g., second actuation 470-2 of FIG. 5). In some embodiments, the second actuator 470-2 is configured for controlling an amount of the fluid flowing out of the tube 420. For instance, in some embodiments, the second actuator 470-2 is configured for controlling the amount of the fluid flowing out of the tube 420 via the outlet port 510. In some embodiments, the second actuator 470-2 is an active valve. In some embodiments, the second actuator 470-2 is a passive valve.

In some embodiments, the tube 420, the piezoelectric actuator 440, the first electrode 450-1, the second electrode 450-2, the impedance layer 460, or a combination thereof is arranged in a multilayer stack. As a non-limiting example, referring to FIG. 6, in some embodiments, the tube 420, the piezoelectric actuator 440, the first electrode 450-1, the second electrode 450-2, and the impedance layer 460 are arranged in the multilayer stack. In some such embodiments, the multilayer stack for embedding between an outer surface (e.g., layer 434 of FIG. 5) and an inner surface (e.g., layer 432-2 of FIG. 5) of the substrate 330.

Referring to FIGS. 6 and 8C, in some embodiments, a respective microfluidic device 300 includes a cantilever anchor (e.g., cantilever anchor 620 of FIG. 6, cantilever anchor 620 of FIG. 8C. In some embodiments, the cantilever anchor is configured to couple the impedance layer 460 and the first layer 432-1 or the second layer 432-2 of the substrate 330 together. However, the present disclosure is not limited thereto. In some embodiments, one or more cantilever anchors 620 is disposed at an inflexion point of the microfluidic device 300, such as at the minimum inflexion point. In some embodiments, this inflexion point is a first point that is farthest from a first actuator 470-1 of the microfluidic device 300. Furthermore, in some embodiments, the cantilever anchor 620 is configured to allow the piezoelectric actuator 460 to oscillate, such as by providing a space for a displacement to occur and/or to strengthen the microfluidic device. Furthermore, in some embodiments, the cantilever anchor 460 includes an opening, such as a conduit or a through-hole, such as for accommodating a portion of a power system (e.g., power system 114 of FIG. 1), such as a power mechanism 810 of FIG. 8C.

Moreover, in some embodiments, the respective microfluidic device 300 includes one or more filler layers (e.g., filler layer 610 of FIG. 6, filler layer 610 of FIG. 7A, filler layer 610 of FIG. 7B, etc.). In some embodiments, the filler layer 610 includes a carbon material, such as a carbon fiber material. However, the present disclosure is not limited thereto. For instance, in some embodiments, the filler layer 610 includes a polymer material, such as a hard coat polymer. Accordingly, the filler layer 610 within the respective microfluidic device 300 allows for a configurable stiffness.

Now that a general topology of the device 100 has been described in accordance with various embodiments of the present disclosures, details regarding some processes in accordance with FIG. 2 will be described. Specifically, FIG. 2 illustrates a flow chart of methods (e.g., method 200), in accordance with embodiments of the present disclosure.

Various modules in the memory 112 of the device 100 perform certain processes of the methods 200 described in FIG. 2, unless expressly stated otherwise. Furthermore, it will be appreciated that the processes in FIG. 2 can be encoded in a single module or any combination of modules.

Block 202. Referring to block 202 of FIG. 2, a method 200 is provided.

The method 200 includes providing an activation signal. In some embodiments, the activation signal is provided by transmitting a signal using a control module (e.g., control module 122 of FIG. 1) through a communication network (e.g., communication network 106 of FIG. 1). However, the present disclosure is not limited thereto.

In some embodiments, the activation signal is an AC signal or is a digital signal converted into an AC signal. In some embodiments, a peak-to-peak voltage (Vpp) (e.g., Vpp of FIG. 8C) of the AC signal is in a range of from about 30 Volts (V) to about 240 V, from about 40 V to about 230 V, from about 50 V to about 200 V, from about 75 V to about 175 V, from about 100 V to about 150 V, or from about 115 V to about 135 V. In some embodiments, the Vpp of the activation signal is about 50 V, about 60 V, about 70 V, about 80 V, about 90 V, about 100 V, about 110 V, about 120 V, about 130 V, about 140 V, about 150 V, about 160 V, about 170 V, about 180 V, about 190 V, or about 200.

The activation signal is configured to activate a first microfluidic device of a plurality of electrically-connected microfluidic devices (e.g., first microfluidic device 300-1 of FIG. 3, first microfluidic device 300-1 of FIG. 4, etc.). In some embodiments, the activation signal is configured to activate each microfluidic device of the plurality of electrically-connected microfluidic devices. In some embodiments, the activation signal is configured to activate a subset of electrically-connected microfluidic devices of the plurality of electrically-connected microfluidic devices. For instance, as a non-limiting example, in some embodiments, each microfluidic device 300 of the plurality of electrically-connected microfluidic devices 300 is individually activated based on the activation signal.

Each electrically-connected microfluidic device 300 of the plurality of electrically-connected microfluidic devices is embedded within a first layer 432-1 and/or a second layer 432-2 of a substrate 330. The first microfluidic device 300-1 includes an inlet port 410 for supplying a fluid into the first microfluidic device 300-1. Furthermore, the first microfluidic device includes a tube 420 for receiving the fluid from the inlet port 410. Additionally, the first microfluidic device 300-1 includes a piezoelectric actuator 440.

Block 204. Referring to block 202, the method further includes electrically actuating the piezoelectric actuator 440 based on the activation signal. From this, an amount of the fluid supplied to the tube 420 via the inlet port 410 is controlled in order to realize a displacement of a portion of the first layer 432-1 and/or the second layer 432-2 of the substrate 330. The portion corresponds to an area of the substrate 330 where the first microfluidic device 300-1 is arranged. Furthermore, the displacement is based on the amount of the fluid in the tube 420 and/or a pressure in the tube 420.

In some embodiments, the displacement of the portion of the first layer 432-1 or the second layer 432-2 is configured to replicate a throbbing feeling, a piercing or pricking feeling, a waving feeling, a fluidic feeling (e.g., water feeling), a breeze or wind feeling, or the like. Said otherwise, in some such embodiments, the activation signal is configured to electrically actuate the piezoelectric actuator 440 in order to replicate a force against the body of the user, such to simulate a force of wind against a hand of the user.

Accordingly, by utilizing the systems, methods, and devices of the present disclosure a signal (e.g., activation signal) to noise performance of the device is improved because no electrostatic discharge voltages or hysteretic shears are generated by the first microfluidic device 300-1 due to a movement of the device that otherwise would lead to such noise.

Moreover, in some embodiments, the plurality of microfluidic deceives 300 are embedded in a flexible substrate 330, which allows for actuating a subset of the plurality of microfluidic devices 300 and/or modify stiffness of the device 100 based on amount of absorption or desorption selectively provided by the tube 420. In this way, the systems, methods, and devices of the present disclosure allow for closing (e.g., reducing a volume) of a cavity within the microfluidic device 300 in accordance with an actuation of the piezoelectric actuator 440 and/or absorption or desorption selectively provided supplying the fluid to the tube 420. In some embodiments, if the a layer of the substrate 330 is embedded with a helical pattern of microfluidic devices 300 that is coupled (e.g., bonded) to the tube 420 (e.g., layer 434 of FIG. 7A, layer 432-2 of FIG. 5, layer 432-1 of FIG. 4, etc.) such as a carbon nanotube woven fabric substrate 330, by a suitable impedance layer 460 configured to impedance match the tube 420, upon providing an activation signal (e.g., a first activation signal have a AC Vpp in between 50 V and 120 V to a first electrode 450-1 and a second electrode 450-2 that have the piezoelectric actuator 440 interposing therebetween), a displacement of about 0.5 mm to about 2.0 mm of a surface of the substrate 330 is realized by controlling the subset of the plurality of microfluidic devices 300 (e.g., a subset associated with circular or helical array of microfluidic devices 300). Moreover, a cavity 710 is fillable with the fluid in order to provide the displacement or enhance the displacement of the surface of the substrate 330.

Example 1: Displacing a Surface of a Substrate Using a Piezoelectric Actuator

A microfluidic device (e.g., microfluidic device 300-1 of FIG. 3, microfluidic device 300 of FIG. 4, microfluidic device 300 of FIG. 5, microfluidic device 300 of FIG. 6, microfluidic device 300 of FIG. 7A, microfluidic device 300 of FIG. 7B, microfluidic device 300-1 of FIG. 8A, microfluidic device 300-1 of FIG. 8B, microfluidic device 300-1 of FIG. 9C, microfluidic device 300-1 of FIG. 9, etc.) was provided.

The microfluidic device 300 included a carbon nanotube (e.g., tube 420 of FIG. 4, tube 420 of FIG. 5, tube 420 of FIG. 6, tube 420 of FIG. 7A, tube 420 of FIG. 7B, etc.).

Furthermore, the microfluidic device 300 included a piezoelectric actuator (e.g., piezoelectric actuator 440 of FIG. 4, piezoelectric actuator 440 of FIG. 5, piezoelectric actuator 440 of FIG. 6, piezoelectric actuator 440 of FIG. 7A, piezoelectric actuator 440 of FIG. 7B, etc.). The piezoelectric actuator was utilized for realizing a displacement of a substrate (e.g., substrate 330 of FIG. 3) to which the microfluidic device 300 is attached.

An electrical actuation was applied in accordance with an activation signal (e.g., generated and/or provided by a control module of a device 100 of FIG. 1) to the piezoelectric actuator 440 in order to cause the displacement of the substrate 330. Said otherwise, when a voltage is applied in accordance with the activation signal, the piezoelectric actuator 440 actuates to creates a pressure gradient and cause the displacement of the substrate 330. In some embodiments, the displacement of the substrate was between 0.5 mm and 2.0 mm.

Example 2: Displacing a Surface of a Substrate Using a Piezoelectric Actuator and Carbon Nanotube A microfluidic device (e.g., microfluidic device 300-1 of FIG. 3, microfluidic device 300 of FIG. 4, microfluidic device 300 of FIG. 5, microfluidic device 300 of FIG. 6, microfluidic device 300 of FIG. 7A, microfluidic device 300 of FIG. 7B, microfluidic device 300-1 of FIG. 8A, microfluidic device 300-1 of FIG. 8B, microfluidic device 300-1 of FIG. 9C, microfluidic device 300-1 of FIG. 9, etc.) was provided.

The microfluidic device 300 included an inlet port (e.g., inlet port 410 of FIG. 4, inlet port 410 of FIG. 5, inlet port 410 of FIG. 6, inlet port 410 of FIG. 7A, inlet port 410 of FIG. 7B, inlet port 410-1 of FIG. 9, inlet port 410-2 of FIG. 9, . . . , inlet port 410-R of FIG. 9, etc.). The inlet port 410 was configured for supplying a fluid into the respective microfluidic device 300. More particularly, in some embodiments, the inlet port 410 was configured to selectively supply the fluid to a tube of the microfluidic device 300 (e.g., tube 420 of FIG. 4, tube 420 of FIG. 5, tube 420 of FIG. 6, tube 420 of FIG. 7A, tube 420 of FIG. 7B, etc.).

The tube 420 included a carbon nanotube (e.g., tube 420 of FIG. 4, tube 420 of FIG. 5, tube 420 of FIG. 6, tube 420 of FIG. 7A, tube 420 of FIG. 7B, etc.), which allowed for selective absorption and/or desorption of the fluid by the tube 420.

Furthermore, the microfluidic device 300 included a piezoelectric actuator (e.g., piezoelectric actuator 440 of FIG. 4, piezoelectric actuator 440 of FIG. 5, piezoelectric actuator 440 of FIG. 6, piezoelectric actuator 440 of FIG. 7A, piezoelectric actuator 440 of FIG. 7B, etc.). The piezoelectric actuator was utilized for realizing a displacement of a substrate (e.g., substrate 330 of FIG. 3) to which the microfluidic device 300 is attached.

The inlet port 410 was controlled in order to control an amount of the fluid and/or a pressure in the tube 420. For instance, in some embodiments, the inlet port 410 was controlled to increase a volume of the fluid in by the tube 420. For instance, in some embodiments, when no activation signal is provided to the piezoelectric actuator 440, the inlet port 410 was controlled to a CLOSED state to retard or arrest a flow of fluid received by the tube 420.

An electrical actuation was applied in accordance with an activation signal (e.g., generated and/or provided by a control module of a device 100 of FIG. 1) to the piezoelectric actuator 440 in order to cause the displacement of the substrate 330. For instance, in some embodiments, the inlet port 410 was controlled to an OPEN state increase the flow of the fluid into the tube 420. Said otherwise, when a voltage is applied in accordance with the activation signal, the piezoelectric actuator 440 actuates to creates a pressure gradient and cause the displacement of the substrate 330. Furthermore, when the voltage causes the piezoelectric actuator 440 to actuate, and therefor change the state of the inlet port, the fluid was allowed to be received by the tube 420, which further contributed to create a pressure gradient and cause the displacement of the substrate 330. In some embodiments, the displacement of the substrate was between 0.5 mm and 2.0 mm.

References Cited and Alternative Embodiments

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain the program modules shown in FIGS. 1 and/or 10. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A microfluidic device, comprising,
   an inlet port for supplying a fluid into the microfluidic device;
   a tube for receiving the fluid from the inlet port;
   a piezoelectric actuator for realizing a displacement of a substrate to which the microfluidic device is attached, the displacement based on (i) an electrical actuation applied to the piezoelectric actuator and (ii) an amount of the fluid or a pressure in the tube; and
   an impedance layer for matching a first impedance of the tube and/or a second impedance of the piezoelectric actuator.

2. The microfluidic device of claim 1, wherein the piezoelectric actuator is arranged closer to a substrate surface that is to realize the displacement than the tube.

3. The microfluidic device of claim 1, further comprising a first actuator for controlling an amount of the fluid supplied to the tube via the inlet port.

4. The microfluidic device of claim 3, wherein the tube is arranged closer to a substrate surface that is to realize the displacement than the piezoelectric actuator.

5. The microfluidic device of claim 3, wherein the piezoelectric actuator includes the first actuator.

6. The microfluidic device of claim 3, further comprising an outlet port for allowing the fluid to flow out of the tube.

7. The microfluidic device of claim 6, further comprising a second actuator for controlling an amount of the fluid flowing out of the tube via the outlet port.

8. The microfluidic device of claim 1, further comprising first and second electrodes for electrically actuating the piezoelectric actuator arranged between the first and second electrodes.

9. The microfluidic device of claim 8, wherein the tube, the piezoelectric actuator, the first and second electrodes, and the impedance layer are arranged in a multilayer stack, the multilayer stack for embedding between an outer surface and an inner surface of the substrate.

10. The microfluidic device of claim 1, wherein the tube includes a carbon nanotube.

11. The microfluidic device of claim 1, wherein the microfluidic device is embedded within a first layer and a second layer of the substrate, and the tube is arranged between (i) the piezoelectric actuator and (ii) the first layer or the second layer.

12. The microfluidic device of claim 1, wherein the impedance layer is composed of Aluminum nitride (AlN) and/or Silicon carbide (SiC).

13. A device, comprising:
a substrate having a first layer and a second layer; and
a plurality of electrically-connected microfluidic devices embedded within the first and second layers of the substrate, each microfluidic device of the plurality of electrically-connected microfluidic devices being individually activated based on an activation signal and including:
an inlet port for supplying a fluid into the respective microfluidic device;
a tube for receiving the fluid from the inlet port; and
a piezoelectric actuator for controlling an amount of the fluid supplied to the tube via the inlet port based on the activation signal to realize a displacement of a portion of the first layer or the second layer of the substrate, the portion corresponding to an area of the substrate where the respective microfluidic device is arranged and the displacement being based on the amount of the fluid or a pressure in the tube.

14. The device of claim 13, wherein the plurality of electrically-connected microfluidic devices is arranged in a helical pattern.

15. The device of claim 13, wherein each microfluidic device of the plurality of electrically-connected microfluidic devices further includes first and second electrodes for electrically actuating, based on the activation signal, the respective piezoelectric actuator arranged between the first and second electrodes.

16. The device of claim 15, wherein each microfluidic device of the plurality of electrically-connected microfluidic devices further includes an impedance layer for matching a first impedance of the tube and/or a second impedance of the piezoelectric actuator.

17. The device of claim 16, wherein the impedance layer is composed of Aluminum nitride (AlN) and/or Silicon carbide (SiC).

18. The device of claim 13, wherein each microfluidic device of the plurality of electrically-connected microfluidic devices further includes an outlet port for allowing the fluid to flow out of the tube.

19. The device of claim 13, wherein the tube includes a carbon nanotube.

20. The device of claim 13, wherein the tube is arranged between (i) the piezoelectric actuator and (ii) the first layer or the second layer.

21. A method comprising:
providing an activation signal for activating a first microfluidic device of a plurality of electrically-connected microfluidic devices embedded within first and second layers of a substrate, the first microfluidic device including:
an inlet port for supplying a fluid into the first microfluidic device,
a tube for receiving the fluid from the inlet port, and
a piezoelectric actuator; and
electrically actuating the piezoelectric actuator based on the activation signal for controlling an amount of the fluid supplied to the tube via the inlet port to realize a displacement of a portion of the first layer or the second layer of the substrate, the portion corresponding to an area of the substrate where the first microfluidic device is arranged and the displacement being based on the amount of the fluid or a pressure in the tube.

* * * * *